United States Patent
Ota et al.

(10) Patent No.: US 11,827,526 B2
(45) Date of Patent: Nov. 28, 2023

(54) INORGANIC COMPOUNDS FOR LITHIUM-ION CONDUCTORS

(71) Applicant: Toyota Motor Engineering & Manufacturing North America, Inc., Plano, TX (US)

(72) Inventors: Shingo Ota, Ann Arbor, MI (US); Ryuta Sugiura, Ann Arbor, MI (US); Timothy S. Arthur, Ann Arbor, MI (US); Nikhilendra Singh, Ann Arbor, MI (US)

(73) Assignees: Toyota Motor Engineering & Manufacturing North America, Inc., Plano, TX (US); Toyota Jidosha Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 17/732,782

(22) Filed: Apr. 29, 2022

(65) Prior Publication Data
US 2023/0348293 A1 Nov. 2, 2023

(51) Int. Cl.
*C01G 49/10* (2006.01)
*C01G 49/00* (2006.01)
*H01M 10/0562* (2010.01)
*H01M 4/62* (2006.01)
*C01F 7/786* (2022.01)
*C01F 17/259* (2020.01)

(52) U.S. Cl.
CPC .... *C01G 49/0018* (2013.01); *H01M 10/0562* (2013.01); *C01F 7/786* (2022.01); *C01F 17/259* (2020.01); *C01G 49/10* (2013.01); *H01M 4/62* (2013.01); *H01M 2300/0008* (2013.01)

(58) Field of Classification Search
CPC .. C01G 49/10; H01M 4/62; H01M 2300/0008
USPC .......................................................... 423/473
See application file for complete search history.

(56) References Cited

U.S. PATENT DOCUMENTS

| | | | | |
|---|---|---|---|---|
| 3,365,269 | A | * 1/1968 | Chamberland | ..... C04B 35/2666 423/464 |
| 4,587,116 | A | * 5/1986 | Livingston | ............. C01G 31/04 423/437.1 |
| 2014/0113182 | A1 | 4/2014 | Hambitzer et al. | |
| 2016/0164135 | A1* | 6/2016 | Fasching | ................. H01M 4/62 429/231.95 |
| 2017/0331149 | A1* | 11/2017 | Sasaki | ................... H01M 4/625 |

OTHER PUBLICATIONS

Imanaka et al., "Water-Insoluble Lanthanum Oxychloride-Based Solid Electrolytes with Ultra-High Chloride Ion Conductivity," Angewandte Chemie, vol. 41, issue 20, Oct. 18, 2002.
Yaguchi et al., "Ruddlesden-Popper Oxychlorides Ba3Y2O5Cl2, Sr3Sc2O5Cl2, and Sr2ScO3Cl: First Examples of Oxide-Ion-Conducting Oxychlorides," ACS Appl. Energy Mater., 2022, 5, 1, pp. 295-304, Dec. 28, 2021.

* cited by examiner

*Primary Examiner* — James E McDonough
(74) *Attorney, Agent, or Firm* — Christopher G. Darrow; Darrow Mustafa PC

(57) ABSTRACT

An inorganic compound for a Li-ion conductor includes an oxyhalide compound with a chemical composition of MOX where M is at least one of Al, Sc, La, and Y, and X is at least one of F, Cl, Br, and I. Also, the oxyhalide compound has a thermal decomposition start temperature of the oxyhalide compound is greater than a thermal decomposition start temperature of FeOCl and a conductivity that is general equal to or greater than a conductivity of the FeOCl.

20 Claims, 2 Drawing Sheets

INORGANIC COMPOUNDS FOR LITHIUM-ION CONDUCTORS

CROSS-REFERENCE TO RELATED APPLICATIONS

The present application is related to U.S. patent application Ser. No. 17/732,644, filed Apr. 29, 2022, U.S. patent application Ser. No. 17/732,964, filed Apr. 29, 2022, U.S. patent application Ser. No. 17/732,736, filed Apr. 29, 2022, and U.S. patent application Ser. No. 17/732,758, filed Apr. 29, 2022, all of which are incorporated herein by reference in their entirety.

TECHNICAL FIELD

The present disclosure generally relates to ionic conductors, and particularly to inorganic ionic conductors.

BACKGROUND

Solid-state inorganic electrolytes provide many advantages in secondary battery design, including mechanical stability, no volatility, and ease of construction. However, $H_2S$ gas can be generated during decomposition of traditional sulfide solid-state inorganic electrolytes and traditional oxide solid-state inorganic electrolytes can have issues with formability due to hardness of the oxide.

The present disclosure addresses these issues with solid-state inorganic electrolytes, and other issues related to solid-state ionic conductors.

SUMMARY

In one form of the present disclosure, an inorganic compound for a Li-ion conductor includes an oxyhalide compound with a chemical composition of MOX. Also, M is at least one of Fe, Al, Sc, La, and Y, and X is at least one of F, Cl, Br, and I.

In another form of the present disclosure, an inorganic compound for a Li-ion conductor includes an oxyhalide compound with a chemical composition of MOX. Also, M is at least one of Al, Sc, La, and Y, X is at least one of F, Cl, Br, and I, and a thermal decomposition start temperature of the oxyhalide compound is greater than a thermal decomposition start temperature of FeOCl.

In still another form of the present disclosure, a method of synthesizing an inorganic compound for a Li-ion conductor includes mixing at least one oxide of M with at least one halide of M. The component(s) or element(s) M is/are selected from at least one Fe, Al, Sc, La, and Y, and the at least one halide of M is selected from at least one of a fluoride of M, a chloride of M, a bromide of M, and an iodide of M. The method also includes heating the mixture of the at least one oxide of M and the at least one halide of M and forming an MOX inorganic oxyhalide compound, where X is at least one of F, Cl, Br, and I.

These and other features of the nearly solvent-free combined salt electrolyte and its preparation will become apparent from the following detailed description when read in conjunction with the figures and examples, which are exemplary, not limiting.

BRIEF DESCRIPTION OF THE DRAWINGS

The present teachings will become more fully understood from the detailed description and the accompanying drawings, wherein.

It should be noted that the figures set forth herein is intended to exemplify the general characteristics of the methods, algorithms, and devices among those of the present technology, for the purpose of the description of certain aspects. The figure may not precisely reflect the characteristics of any given aspect and are not necessarily intended to define or limit specific forms or variations within the scope of this technology.

DETAILED DESCRIPTION

The present disclosure provides inorganic compounds for lithium-ion (Li-ion) conductors and a method of synthesizing the inorganic compounds. The inorganic compounds include an oxyhalide compound with a chemical composition of MOX. The component(s) or element(s) M is/are at least one of iron (Fe), aluminum (Al), scandium (Sc), lanthanum (La), and yttrium (Y), and X is at least one of fluorine (F), chlorine (Cl), bromine (Br), and iodine (I). In some variations, M is selected from at least one of Al, Sc, La, and Y, and in such variations the MOX oxyhalide compound can have a thermal stability greater than a thermal stability of FeOCl and/or an ionic conductivity greater than or equal to an ionic conductivity of FeOCl. Also, the inorganic compound(s) can be included in a Li-ion electrolyte and/or in a positive electrode coating layer.

The method of synthesizing the inorganic compounds includes mixing at least one oxide of M with at least one halide of M, where M is selected from at least one Fe, Al, Sc, La, and Y, and the at least one halide of M is selected from at least one of a fluoride of M, a chloride of M, a bromide of M, and an iodide of M. The method also includes heating the mixture of the at least one oxide of M and the at least one halide of M and forming an MOX inorganic oxyhalide compound, where X is at least one of F, Cl, Br, and I.

Figure 1:
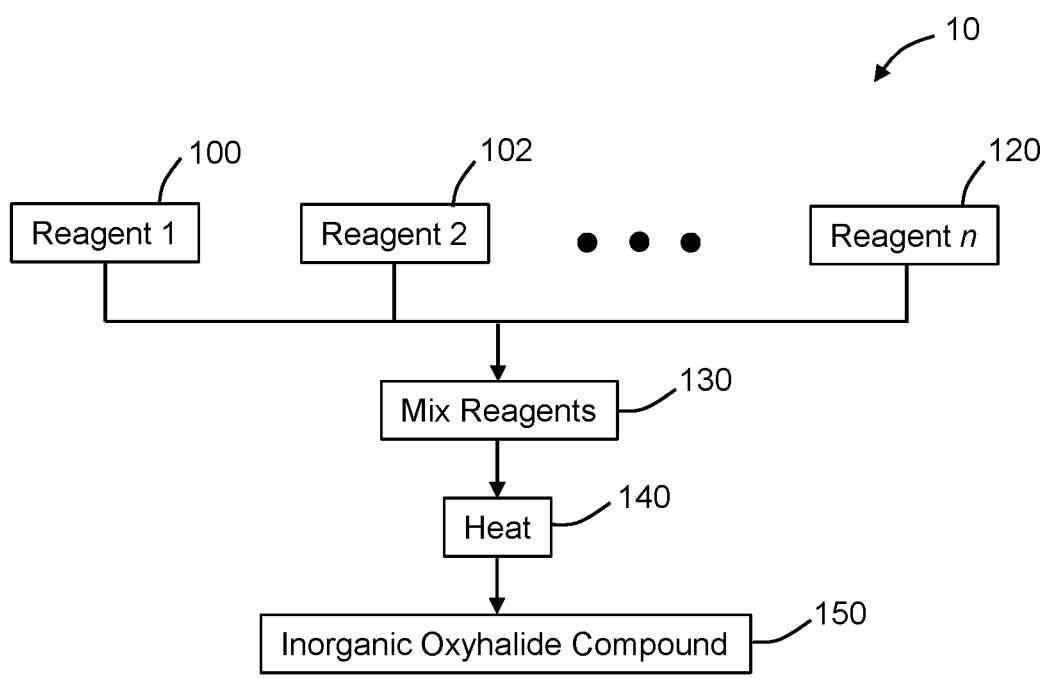
FIG. 1 shows a flow chart for a method of synthesizing an inorganic oxyhalide compound according to the teachings of the present disclosure.

Referring now to FIG. 1, a flow chart for one non-limiting method 10 of synthesizing inorganic compounds for Li-ion conductors according to the present disclosure is shown. The method 10 includes mixing two or more reagents 100, 102, . . . 120 at 130. For example, the two or more reagents 100, 102, . . . 120 can be weighed and mixed in an argon (Ar) glove box with a dew point less than about 90° C. The one or more reagents 100, 102, . . . 120 include at least one oxide of M and at least one halide of M, where M is at least one Fe, Al, Sc, La, and Y, and the at least one halide of M is at least one of a fluoride of M, a chloride of M, a bromide of M, and an iodide of M. Examples of oxides of M include $Sc_2O_3$, $Al_2O_3$, $Fe_2O_3$, $Y_2O_3$, and $La_2O_3$, among others, and examples of halides of M include $ScF_3$, $ScCl_3$, $ScBr_3$, $ScI_3$, $AlF_3$, $AlCl_3$, $AlBr_3$, $AlI_3$, $FeF_3$, $FeCl_3$, $FeBr_3$, $FeI_3$, $YF_3$, $YCl_3$, $YBr_3$, $YI_3$, $LaF_3$, $LaCl_3$, $LaBr_3$, and $LaI_3$, among others.

In some variations, the reagents 100, 102, . . . 120 are in the form of powders that are mechanically mixed (together). For example, in some variations, powders of the reagents 100, 102, ... 120 are mechanically mixed at 130 using a mortar and pestle and/or a ball mill such that a mechanical mixture of the oxide and halide powders is formed.

Heat is applied to the mixture of reagents at 140 and an inorganic oxyhalide compound is formed at 150. In some variations, the mixture of reagents is heated to a temperature above 100° C., for example above 200° C. For example, the mixture of reagents can be vacuum sealed in a container (e.g., a glass tube) and heated within the container to form the inorganic oxyhalide compound at 150. And in one example, the inorganic oxyhalide compound FeOCl was synthesized by weighing and mixing together powders of $Fe_2O_3$ and $FeCl_3$, vacuum sealing the mixture of powders in a glass tube and heating the mixture of powders in the vacuumed sealed glass tube to a predetermined temperature for a predetermined period of time.

Figure 2:
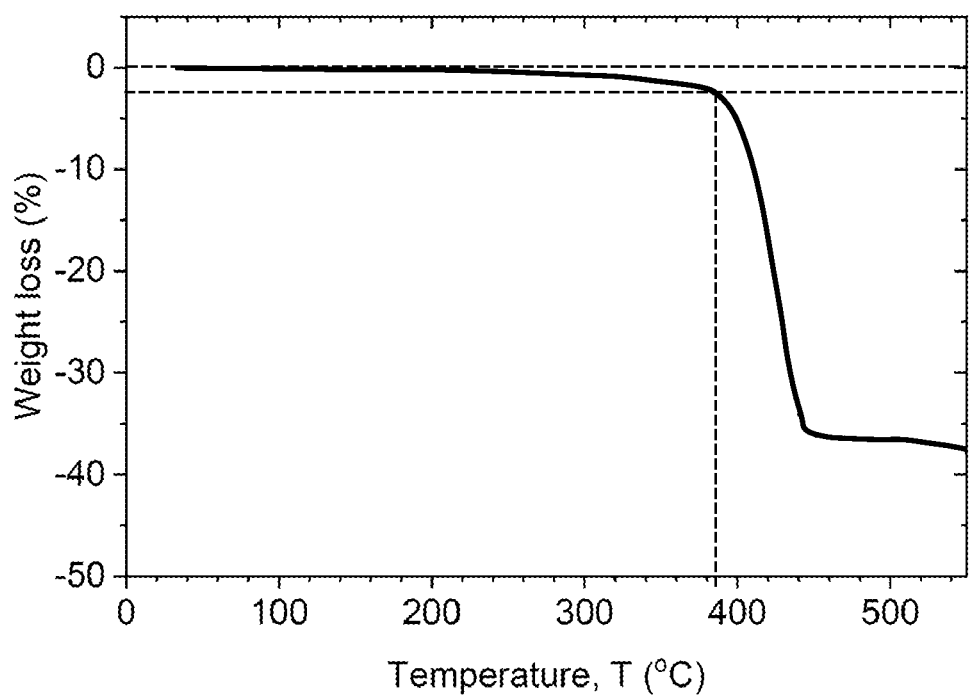
FIG. 2 is a plot of weight loss versus temperature during thermal gravimetric analysis (TGA) of an FeOCl sample synthesized according to the teachings of the present disclosure.
Figure 3:
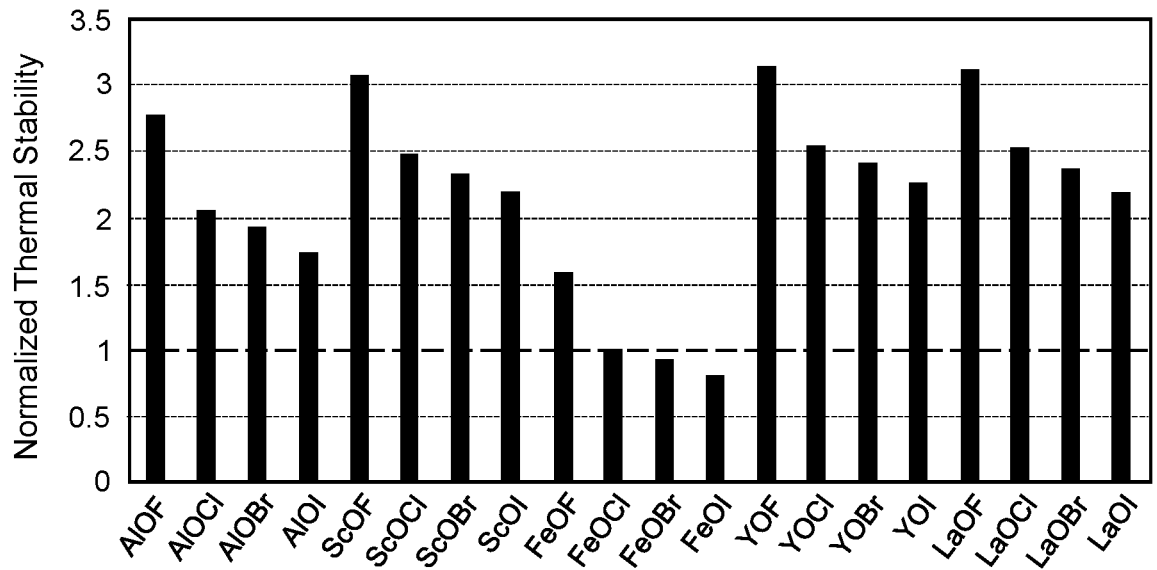
FIG. 3 is a plot of normalized thermal stability for a plurality of inorganic oxyhalide compounds.

Referring to FIGS. 2 and 3, a plot of percent weight loss versus temperature for an FeOCl sample synthesized as described above is shown in FIG. 2 and a plot of normalized thermal stability for a plurality of inorganic oxyhalide compounds relative to the thermal stability of FeOCl is shown in FIG. 2. The FeOCl sample (FIG. 2) was heated at a rate of about 20° C. per minute in dry air with a dew point of about −60° C. Also, a thermal decomposition temperature for the sample was defined as the temperature at which the sample exhibited 2.5% weight loss and the FeOCl sample had a thermal decomposition temperature of about 385° C., Referring particularly to FIG. 3 only FeOBr and FeOI have thermal stabilities less that the thermal stability of FeOCl. In addition, the inorganic oxyhalides AlOF, AlOCl, ScOF, ScOCl, SCOBr, ScOI, YOF, YOCl, YOBr, YOI, LaOF, LaCL, LaOBr, and LaOI exhibit a normalized thermal stability that is at least two times greater than the thermal stability of FeOCl, and ScOF, YOF, and LaOF exhibit a normalized thermal stability that is at least three times greater than the thermal stability of FeOCl. As such, the inorganic oxyhalides AlOF, AlOCl, ScOF, ScOCl, SCOBr, ScOI, YOF, YOCl, YOBr, YOI, LaOF, LaCL, LaOBr, and LaOI can be expected to exhibit a thermal decomposition temperature significantly greater than 385° C., for example, greater than 500° C. and/or greater than 600° C. In addition, use or incorporation of such inorganic oxyhalides and/or the use or incorporation FeOCl doped or mixed with such inorganic oxyhalides in a Li-ion electrolyte can provide enhanced thermal stability of a Li-ion conductor.

Figure 4:
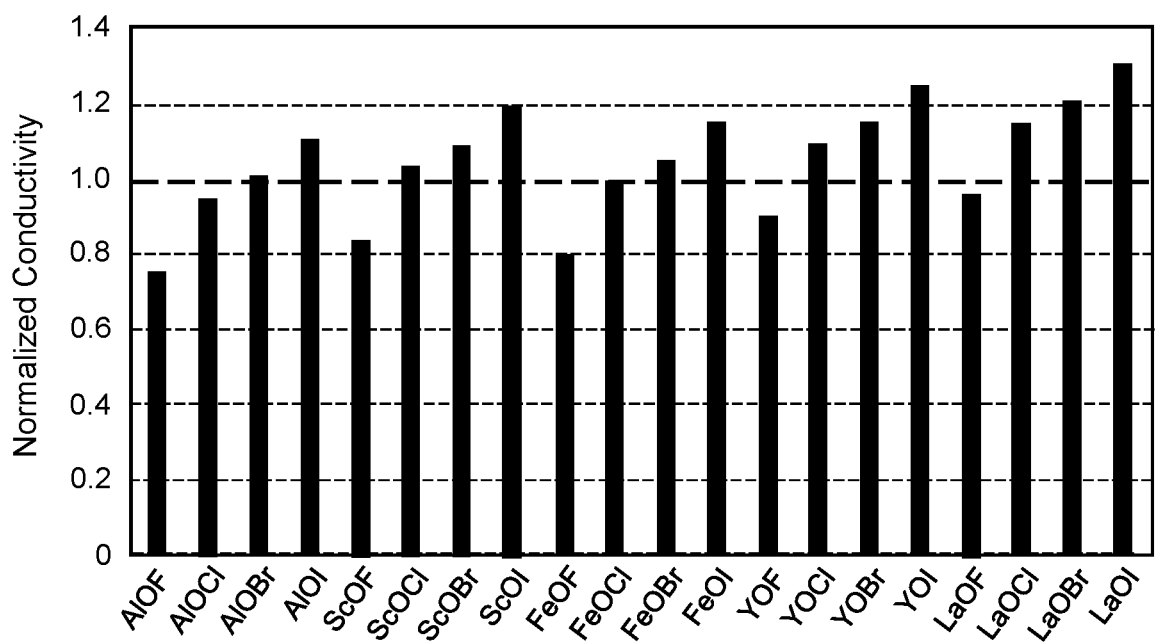
FIG. 4 is a plot of normalized conductivity for the plurality of inorganic oxyhalide compounds in FIG. 3.

Referring to FIG. 4, a plot showing normalized conductivity for the plurality of inorganic oxyhalide compounds in FIG. 3 relative to the conductivity of FeOCl is shown. And as observed from FIG. 4, only AlOF, AlOCl, ScOF, FeOF, YOF and YOI have conductivities less that the conductivity of FeOCl and with AlOCl, YOF, and LaOF having conductivities within 10% of the conductivity of FeOCl. In addition, the inorganic oxyhalides AlOBr, AlOI, ScOCl, ScOBr, FeOBr, YOCl, YOI, LaOCl, LaOBr, and LaOI have conductivities either generally equal to or greater than the conductivity of FeOCl. Accordingly, the inorganic oxyhalides AlOBr, AlOI, ScOCl, ScOBr, SOI, YOCL, YOBr, LaOF, LaOCl, LaOBr, and LaOI exhibit thermal stabilities greater than the thermal stability of FeOCl and conductivities equal to or greater than the conductivity of FeOCl. Also, the use or incorporation of such inorganic oxyhalides and/or the use or incorporation FeOCl doped or mixed with such inorganic oxyhalides in a Li-ion electrolyte can provide enhance thermal stability of a Li-ion conductor without a decrease in the conductivity of the Li-ion conductor.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple forms or variations having stated features is not intended to exclude other forms or variations having additional features, or other forms or variations incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with a form or variation is included in at least one form or variation. The appearances of the phrase "in one variation" or "in one form" (or variations thereof) are not necessarily referring to the same form or variation. It should be also understood that the various method steps discussed herein do not have to be carried out in the same order as depicted, and not each method step is required in each form or variation.

The foregoing description of the forms or variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

While particular forms or variations have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. An inorganic compound comprising:
   an oxyhalide compound with a chemical composition of MOX where M is Fe and at least one of Al, Sc, La, and Y, and X is at least one of F, Cl, Br, and I.

2. The inorganic compound according to claim 1, wherein a thermal decomposition start temperature of the oxyhalide compound is greater than a thermal decomposition start temperature of FeOCl.

3. The inorganic compound according to claim 2, wherein an ionic conductivity of the oxyhalide compound is equal to or greater than an ionic conductivity of FeOCl.

4. The inorganic compound according to claim 1 further comprising a positive electrode coating layer containing the oxyhalide compound.

5. The inorganic compound according to claim 4, wherein a thermal decomposition start temperature of the positive electrode coating layer is greater than a thermal decomposition start temperature of FeOCl.

6. The inorganic compound according to claim 4, wherein an ionic conductivity of the positive electrode coating layer is equal to or greater than an ionic conductivity of FeOCl.

7. An inorganic compound comprising:
   an oxyhalide compound comprising:
      a chemical composition of MOX where M is Fe and at least one of Al, Sc, La, and Y, and X is at least one of F, Cl, Br, and I; and
      a thermal decomposition start temperature of the oxyhalide compound is greater than a thermal decomposition start temperature of FeOCl.

8. The inorganic compound according to claim 7, wherein an ionic conductivity of the oxyhalide compound is equal to or greater than an ionic conductivity of FeOCl.

9. The inorganic compound according to claim 7 further comprising a positive electrode coating layer containing the oxyhalide compound, wherein a thermal decomposition start temperature of the positive electrode coating layer is greater than a thermal decomposition start temperature of FeOCl.

10. The inorganic compound according to claim 9, wherein an ionic conductivity of the positive electrode coating layer is equal to or greater than an ionic conductivity of FeOCl.

11. The inorganic compound according to claim 1, wherein M comprises Fe and Al and X is Cl.

12. The inorganic compound according to claim 1, wherein M comprises Fe and Sc and X is Cl.

13. The inorganic compound according to claim 1, wherein M comprises Fe and La and X is Cl.

14. The inorganic compound according to claim 1, wherein M comprises Fe and Y and X is Cl.

15. The inorganic compound according to claim 1, wherein M comprises Fe and Al and X is F.

16. The inorganic compound according to claim 7, wherein M comprises Fe and Al and X is Cl.

17. The inorganic compound according to claim 7, wherein M comprises Fe and Sc and X is Cl.

18. The inorganic compound according to claim 7, wherein M comprises Fe and La and X is Cl.

19. The inorganic compound according to claim 7, wherein M comprises Fe and Y and X is Cl.

20. The inorganic compound according to claim 7, wherein M comprises Fe and Al and X is F.

* * * * *